United States Patent [19]

Vallee et al.

[11] Patent Number: 5,755,985
[45] Date of Patent: May 26, 1998

[54] LPB ELECTROLYTE COMPOSITIONS BASED ON MIXTURES OF COPOLYMERS AND INTERPENETRATED NETWORKS

[75] Inventors: Alain Vallee, Longueuil; Michel Duval, Montreal; Fernand Brochu, Longueuil, all of Canada; Michiyuki Kono, Osaka, Japan; Eriko Hayashi, Kyoto, Japan; Tsutomu Sada, Shiga, Japan

[73] Assignees: Hydro-Quebec, Montreal, Canada; Dai-Ichi Kogyo Seiyaku Co., Ltd., Kyoto, Japan

[21] Appl. No.: 371,437

[22] Filed: Jan. 11, 1995

Related U.S. Application Data

[63] Continuation-in-part of Ser. No. 301,575, Sep. 7, 1994, abandoned, which is a continuation-in-part of Ser. No. 300,555, Sep. 6, 1994, abandoned.

[51] Int. Cl.[6] ............................................. H01M 6/18
[52] U.S. Cl. ............................ 252/62.2; 429/192; 429/189
[58] Field of Search ........................... 252/62.2; 429/192, 429/189

[56] References Cited

U.S. PATENT DOCUMENTS

| | | |
|---|---|---|
| 4,303,748 | 12/1981 | Armand et al. . |
| 4,357,401 | 11/1982 | Andre et al. . |
| 4,505,997 | 3/1985 | Armand et al. . |
| 4,578,326 | 3/1986 | Armand et al. . |
| 4,579,793 | 4/1986 | Armand et al. . |
| 4,758,483 | 7/1988 | Armand et al. . |
| 4,818,643 | 4/1989 | Cook et al. . |
| 4,851,307 | 7/1989 | Armand et al. . |
| 4,968,319 | 11/1990 | Muller et al. . |
| 5,063,124 | 11/1991 | Gauthier et al. . |
| 5,240,791 | 8/1993 | Izuti et al. ........................ 252/62.2 |
| 5,348,824 | 9/1994 | Duval . |

FOREIGN PATENT DOCUMENTS

| | | |
|---|---|---|
| 1 269 702 | 5/1990 | Canada . |
| WO 92/02966 | 2/1992 | WIPO . |

*Primary Examiner*—Alan Diamond
*Attorney, Agent, or Firm*—Oblon, Spivak, McClelland, Maier & Neustadt, P.C.

[57] ABSTRACT

Polymer electrolyte compositions for lithium electrochemical generators of the LPB type (lithium polymer electrolyte battery), comprising a mixture of polymers wherein one of the components has a high molecular weight, such as those used currently in LPB batteries, and wherein the other component is a low molecular weight polymer resulting in a more efficient and faster multi-dimensional cross-linking by irradiation, so as to give a network which is interpenetrated or not and films of electrolyte being have better mechanical properties and lower thicknesses, while preserving the good properties of adhesion on the electrodes and the choice of the coating techniques.

20 Claims, 2 Drawing Sheets

1

LPB ELECTROLYTE COMPOSITIONS BASED ON MIXTURES OF COPOLYMERS AND INTERPENETRATED NETWORKS

CROSS-REFERENCE

This application is a continuation-in-part of application Ser. No. 08/301,575 now abandoned, which is a continuation-in-part of application Ser. No. 08/300,555 filed Sep. 6, 1994 now abandoned.

BACKGROUND OF THE INVENTION

1) Field of the Invention

The present invention concerns polymer electrolyte compositions for lithium electrochemical generators of the LPB type. As used herein and in the appended claims, the term LPB means a lithium polymer electrolyte battery. More specifically, the invention relates to mixtures wherein one of the components is a homopolymer or copolymer of high molecular weight (such as >25,000), which is cross-linkable or non cross-linkable, having a density of cross-linking bonds which is not too high so as to ensure good properties of adhesion on the electrodes, and wherein the second component is a compound, such as a homopolymer, copolymer or ter-polymer of low molecular weight (such as <20,000) and which may even be an oligomer or a monomer, which is cross-linkable multidimensionally by irradiation or thermal means, ensuring superior mechanical properties to the mixture, and in which the terminal groups which are potentially reactive towards the electrodes have preferably been inactivated by treatment. A salt of lithium may be added to the mixtures, and the choice of the most appropriate methods of coating is determined by the proportions of each of the components.

2) Description of Prior Art

Polymer electrolyte/lithium LPB batteries result from the lamination and assembly of three types of main thin films: a film of a positive electrode containing an electrochemically active material such as vanadium oxide, an electrolyte film made of a polymer and a salt of lithium, and a film of lithium. Each of these films is between 15 and 50 µm thick, for a total thickness of the film of the elementary battery of 100 to 150 µm. About 30 meters of film 15 cm wide is typically required to give a battery of 100 Wh.

Armand, in U.S. Pat. No. 4,303,748 describes families of polymer which may be used as electrolytes in polymer electrolyte/negative lithium electrode batteries. More elaborate families of polymers (copolymers and terpolymers which are cross-linkable or not cross-linkable) are described in more detail in U.S. Pat. Nos. 4,578,326, 4,357,401, 4,579,793, 4,758,483, Canadian Patent No. 1,269,702, and Canadian application No. 2,111,049.

Different coating methods may be used to prepare electrolyte films from these families of polymers, depending on their visco-elastic properties and the thicknesses of the desired films: coating by a solvent or hot-melt method, on a peelable support or directly over the positive electrode (U.S. Pat. No. 4,968,319, and Canadian Application No. 2,109,246 filed on Oct. 26, 1993). The electrolyte films thus obtained may thereafter be cross-linked, for example by thermal means or by means of the cross-linkable functions which are present in the polymer. The mechanical properties of these films, which are good up to thicknesses of about 20 µm, are however insufficient for the smaller thicknesses (<10 µm) which are necessary for the advanced batteries of the future, where the risks of short-circuits or perforation of the electrolyte are greatly increased. The relatively low density of cross-linking bonds required to preserve a good adhesion to the electrodes leads to a visco-elasticity which is too low. The time necessary for cross-linking these systems are also very long in terms of industrial production (1 to 4 hours).

SUMMARY OF INVENTION

The invention consists in adding into the polymer electrolyte a certain quantity of at least another compound of lower molecular weight, enabling to ensure a very good cross-linking efficiency and to produce a highly cross-linked network providing an increased mechanical cohesion to the film of electrolyte while preserving its good properties of adhesion toward the electrodes and the possibility of choosing the method of coating.

The invention therefore concerns polymer electrolyte compositions for LPB electrochemical batteries, consisting of positive and negative electrodes, and of one electrolyte including a polymer matrix, the latter being characterized in that it comprises a mixture of two distinct types of polymers:

a) a homopolymer, copolymer or terpolymer used in LPB batteries, of high molecular weight (>25,000), for example selected from the polymers currently used in LPB electrolytes described in U.S. Pat. Nos. 4,303,748; 4,357,401; 4,578,326, 4,579,793 and 4,758,483, as well as Canadian Patent No. 1,269,702 and Canadian application No. 2,111,049, which are cross-linkable or not cross-linkable, preferably by means of reactive groups, for example of the allyl type, which are present along the polymer chains, and providing good properties of adhesion to the electrodes; more particularly, reference is made to U.S. Pat. Nos. 4,303,748 and 4,578,326 for non-cross-linkable polymers, and to U.S. Pat. Nos. 4,758,483; 4,357,401 and 4,579,793 for cross-linkable polymers.

b) at least one homopolymer, copolymer or terpolymer of low molecular weight (<20,000), or even an oligomer or a monomer, having reactive groups which can be specifically localized at the end of the main or lateral chains, or statistically or block distributed in the main chain, in order to ensure a more efficient and easier multi-dimensional cross-linking than in the case of the polymers of type (a), and enabling to produce stronger and thinner electrolyte films, for example by thermal means or by ultra violet or electronic radiation, said polymers preferably being electrochemically compatible with the materials of the electrodes in that they do not react chemically or electrochemically or form harmful passivating films with said electrodes and for this purpose, may have their reactive terminal groups chemically treated before use, said compounds being preferably capable of solvating lithium salts used in generators, and as much as possible being chemically compatible with the polymers of type (a) to prevent phase separations or demixing inside the electrolyte.

The reactive groups enabling cross-linking may be selected from the allyl, vinyl, acrylate or methacrylate groups, or issued from compounds having at least one reactive double bond.

The families of compounds of type (a) which may be used may be selected from the following:

Non cross-linkable polymers consisting of
(i) a homo or copolymer containing chains comprising at least one heteroatom of oxygen or nitrogen, for four, preferably even for two atoms of carbon of the said chains, these heteroatoms either participating directly in the formation of said chains, either being directly linked, but laterally, to carbon atoms of a chain constituted by a homogenous sequence of carbon atoms, in the ratio of one heteroatom to four, preferably to two carbon atoms wherein the macromolecular material of the solid electrolyte is a derivative of monomer units of the type represented either by the following formula

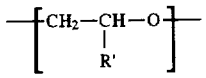

in which R' represents an hydrogen atom or one of the groups Ra, —CH$_2$—O—Ra, —CH$_2$—O—Re—Ra, —CH$_2$—N=(CH$_2$)$_2$, with Ra representing an alkyl or cycloalkyl radical comprising notably 1 to 16, preferably 1 to 4 carbon atoms, Re representing a polyether radical of the general formula —(CH$_2$—CH$_2$—O)$_p$—, p having a value from 1 to 100, notably from 1 to 2, or by the formula:

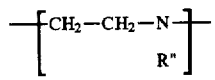

in which R" represents Ra, —Re—Ra, with Ra and Re having respectively one of the above indicated meanings, or by the following formula:

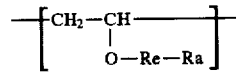

in which Ra and Re have respectively one of the above indicated meanings or (ii) a copolymer of ethylene oxide and a cyclic ether oxide, said copolymer having a polyether structure and a proportion of cyclic ether units to ethylene oxide units whereby said macromolecular material is non-crystalline at ambient temperatures, said ether oxide is of the formula:

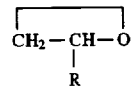

in which R represents an alkyl or alkenyl radical having 1 to 12 carbon atoms, or a CH$_2$—O—Re—Ra radical, in which Ra is an alkyl or alkenyl radical having 1 to 12 carbon atoms and Re represents a polyether radical of the formula (CH$_2$—CH$_2$—O)—$_p$, wherein p is from 0 to 10.

wherein when R is a methyl or ethyl radical, or an alkyl radical, said cyclic ether of oxide unit is present in a quantity of 0—not included—to 25% in molar percentage with respect to the total number of moles, wherein when R is CH$_2$—O—CH$_3$, or a CH$_2$—O—Re—Ra radical, said cyclic ether oxide unit is present in an amount from 0—not included—to 30% in molar percentage expressed with respect to the total number of moles, wherein said cyclic ether oxide unit may be selected from among cyclic ether oxides having more than three bonds consisting of oxetane, tetrahydrofurane, dioxolane, dioxane and their derivatives;

crosslinkable polymers consisting of (i) a random polyether copolymer of ethylene oxide and an ether and an ether oxide selected from the group consisting of a substituted ether oxide of the formula:

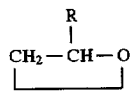

wherein R is Ra, wherein Ra is alkyl, alkenyl, or alkylnyl having 1 to 12 carbon atoms or —CH$_2$—O—Re—Ra wherein Ra is defined above, Re is a polyether of the formula —(CH$_2$—CH$_2$—O)p, wherein p is an integer from 0 to 10 and a cyclic ether wherein the ring has more than 3 carbon atoms, wherein the cross-linking is by means of a short cross-linking agent, which can be selected from the group of a metal, or a non-metal atom which is at least divalent, which can be selected from the group consisting of silicon, cadmium, boron, titanium, aluminum, zinc, magnesium and tin, or wherein the cross-linking agent is linked to a polymer chain by an oxygen atom, and wherein the ether oxide is selected from the group of tetrahydrofurane, dioxolane and their derivatives and cyclic ether oxides, or (ii) a macromolecular material of cross-linked polymers or oligomers containing heteroatoms in the monomer unit or in side chains as well as cross-linkable functions, characterized by the fact that the heteroatoms are selected from among nitrogen, oxygen, sulfur and phosphorus, the ratio of the number of carbon atoms to the number of heteroatoms in the polymer or oligomer is between 1 and 12, and the polymers or oligomers are sequenced or grafted statistical copolymers or sequenced or grafted polycondensates derived from cyclic ethers, formaldehyde, acetaldehyde, aziridines or ethylene diamine, or (iii) an organometallic polymer comprises an organic polymer in which a metal is directly connected by the intermediacy of an oxygen atom to at least two of the organic polymer chains, wherein the organic polymer comprises at least one monomer containing at least one heteroatom capable of forming a donor-acceptor type bond with the cation of the salt, and wherein the metal bridging agent has at least two carbon-metal bonds, with the metal being chosen from the group consisting of aluminum, zinc, and magnesium, wherein the organic polymer comprises a monomer moiety of the formula:

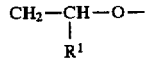

wherein R$^1$ is hydrogen, Ra, —CH$_2$—O—Re—Ra or —CH$_2$—N(CH$_3$)$_2$, wherein Ra is C$_{1-16}$ alkyl or a C$_{1-16}$ cycloalkyl, and Re is a polyether group of the following formula

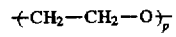

wherein p is an integer with a value from 1 to 100, wherein the organic polymer further comprises a monomer moiety of the formulas

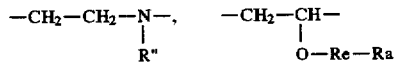

wherein R" is Ra or —Re—Ra, or

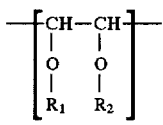

wherein $R_1$ and $R_2$ are independently Re, Ra, —Re—Ra or —Re—Ra, and wherein Re may be a group of the following formula

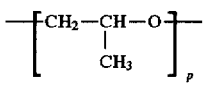

The families of compounds of type (b) which may be used may be selected from the following:

block copolymers described in PCT/FR92/00542, of type AB, BAB, ABA and derivatives thereof, where A is a homopolymer or a copolymer of ethylene oxide having a molecular weight of 150 to 20,000, and B is a segment including a functional group enabling cross-linking, and issued from a polymer of at least one monomer selected from styrene, α-methyl styrene and derivatives thereof, acrylonitrile, methacrylonitrile, acrylates and methacrylates or compounds having at least one reactive double bond. The residual reactive ends of the polymer may be deactivated by conversion into ether, ester or amide groups to prevent reactions with the materials of the electrodes of the generator, for example the -OH groups by means of acryloyl chloride, to convert them into acryloyl groups or into acrylic acid ester or methacrylic acid groups of the formula

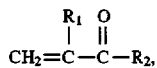

where $R_1$ represents an H or alkyl group, $R_2$ an OH, or $OR_3$ or X group, $R_3$ an alkyl group and X an halogen group. An example of such copolymers may be schematically illustrated by the formula BAB, where A is a polyethylene oxide POE or a copolymer of POE and POP (polypropylene oxide) and where

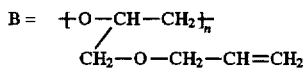

is a polyallylglycidyl ether.

Copolymers described in PCT/FR92/10033, obtained by a polycondensation reaction, consisting of segments A consisting of homopolymers or copolymers of ethylene oxide or derivatives thereof, and B' segments consisting of radicals having at least one double bond (for example derivatives of alkynes, styrene or dimethylfurane). These copolymers may be schematically illustrated by the formula AB'A, where for example A is POE or a copolymer POE/POP and B' is a vinyl group:

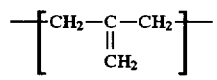

Copolymers equivalent to type a) copolymers, but in which the molecular weight is <20,000 and/or the reactive groups are characteristic of type b) copolymers, i.e. lead to multidimensional cross-linking. These can be multidimensional cross-linking. These can be prepared for example by anionic polymerization. The residual reactive ends of these copolymers of type b), which are more numerous and harmful than in copolymers of type a) of higher molecular weights, may need to be deactivated especially if they consist of OH-groups, by conversion into ethers, esters, amides, acrylates, methacrylates or compounds having at least one active double bond.

Copolymers of the type B"AB" wherein A is a homopolymer or a copolymer of ethylene oxide or derivatives thereof, and B" is an acrylate group

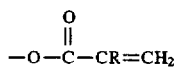

wherein R is H or $CH_3$ or a methacrylate. Polyethylene glycol diacrylates and dimethacrylates, in particular, are commercially available from Polysciences in a plurality of molecular weights of POE.

Copolymers of the type AB" wherein A is a homopolymer or a copolymer of ethylene oxide or derivatives thereof, and B" is an acrylate group

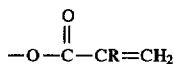

wherein R is H or $CH_3$

These are commercially available from Polysciences.

Copolymers of formula:

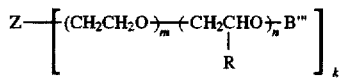

wherein

Z is a residue of a compound having an active hydrogen, m is a number equal to 0 or a whole number to less than 1, n is a number equal to 0 or a whole number to less than 1, B'" is an alkyl group, an acyl group or a group having at least one reactive double bond, R is an alkyl group, an alkenyl group or a group of formula:

wherein

Ra is an alkyl or alkenyl group, and

Rc is a segment of formula:

wherein p is a whole number which varies between 0 and 25.

Particularly appropriate compositions are those wherein

Z is a residue of glycerin or trimethylolpropane and k is a number equal to 3,

Z is a residue of ethylene glycol and k is a number equal to 2.

The compounds of type b) described above are well adapted to cross-linking by irradiation, in the presence of a photo-initiator of the Irgacure® type said cross-linking being very rapid (a few seconds or minutes) as compared to thermal free radical cross-linking.

The relative proportions of the polymers of type a) and b) in the mixture may be adjusted so as to give the desired properties of mechanical hardness and adhesion of the films of electrolyte, to be able to use the most adequate process of coating, and depending on the molecular weight of the component of type b). Thus, a larger proportion of the compound of type b) will lead to a film of higher mechanical hardness but less adhesive to the electrodes, and provide less viscous mixtures, which are easier to coat by gravure, reverse roll or hot melt processes. On the other hand, a larger proportion of the polymer of type a) will produce a film having a better adhesion to the electrodes which can be obtained by extrusion or hot melt processes.

It goes without saying that, whatever the mixture selected, a salt of lithium should be added to provide an ionic conductivity to the electrolyte. Salts based on lithium trifluorosulfonimide (TFSI) described in U.S. Pat. No. 4,505,997 as well as the lithium salts derived from lithium bis-perhalogenoacyl or -sulfonylimide, which are cross-linkable or not cross-linkable, described in U.S. Pat. Nos. 4,818,644 (Apr. 4, 1989) and PCT WO92/02966 (Jul. 25; 1991) and which are currently used in batteries of the LPB type, are particularly appropriate as well as the following lithium salts: $LiClO_4$, $LiSCN$, $LiBF_4$, $LiAsF_6$, $LiCF_3SO_2$ and $LiPF_6$.

In accordance with a preferred embodiment, the electrolyte polymer matrix is essentially free of plasticizer.

It also goes without saying that the invention also applies to the mixtures containing a liquid plasticizer such as propylene carbonate, ethylene carbonate, tetrahydrofuran, 2-methyl tetrahydrofuran, 1,3-dioxolan, 4,4-dimethyl-1,3-dioxolan, γ-butyrolactone, butylene carbonate, sulfolane, 3-methylsulfolane, tert-butyl ether, iso-butyl ether, 1,2-dimethoxy ethane, 1,2-ethoxymethoxy ethane, ethylene glycol-diethyl ether, polyethylene glycols or sulfonamides as described for example in U.S. Pat. Nos. 4,851,307 (1989) and 5,063,124 (1991).

In the case where the polymer of type a) possesses groups which can take part in the cross-linking reaction, an interpenetration of the cross-linking networks may take place between the polymers of type a) and the compounds of type b), leading to an even stronger network, due to the increased probability of reaction of the cross-linking groups of type a) with those of type b), which are more accessible or more reactive.

BRIEF DESCRIPTION OF DRAWINGS

The invention will now be illustrated by the annexed drawings given without restriction, in which.

DESCRIPTION OF EXAMPLES AND PREFERRED EMBODIMENTS

The invention will now be described by the examples which follow given only for the purpose of illustration but without limitation.

EXAMPLE 1

All the manipulations are carried out in a glove box under an inert and anhydrous atmosphere. 367 g of a terpolymer based on ethylene oxide, methyl-glycidyl ether and allylglycidyl ether and 82 g of bis(trifluoromethanesulfonimide) lithium salt are added to 1638 ml of acetonitrile. The salt and terpolymer concentration was adjusted so as to give an oxygen over lithium molar ratio (O/Li) of 30/1.

To 20.0 ml of this mother solution, 0.90 ml of a solution obtained by dissolving 4.5 g of bis (trifluoromethanesulfonimide) lithium salt in 20.0 ml of commercial polyoxyethylene glycol diacrylate of molecular weight 200 (available from Polysciences) is added. The mixture of these two solutions is then stirred at room temperature for about 12 hours. 2% of benzoyl peroxide by weight of polymer are added and the solution is again stirred for 90 minutes.

Figure 1:
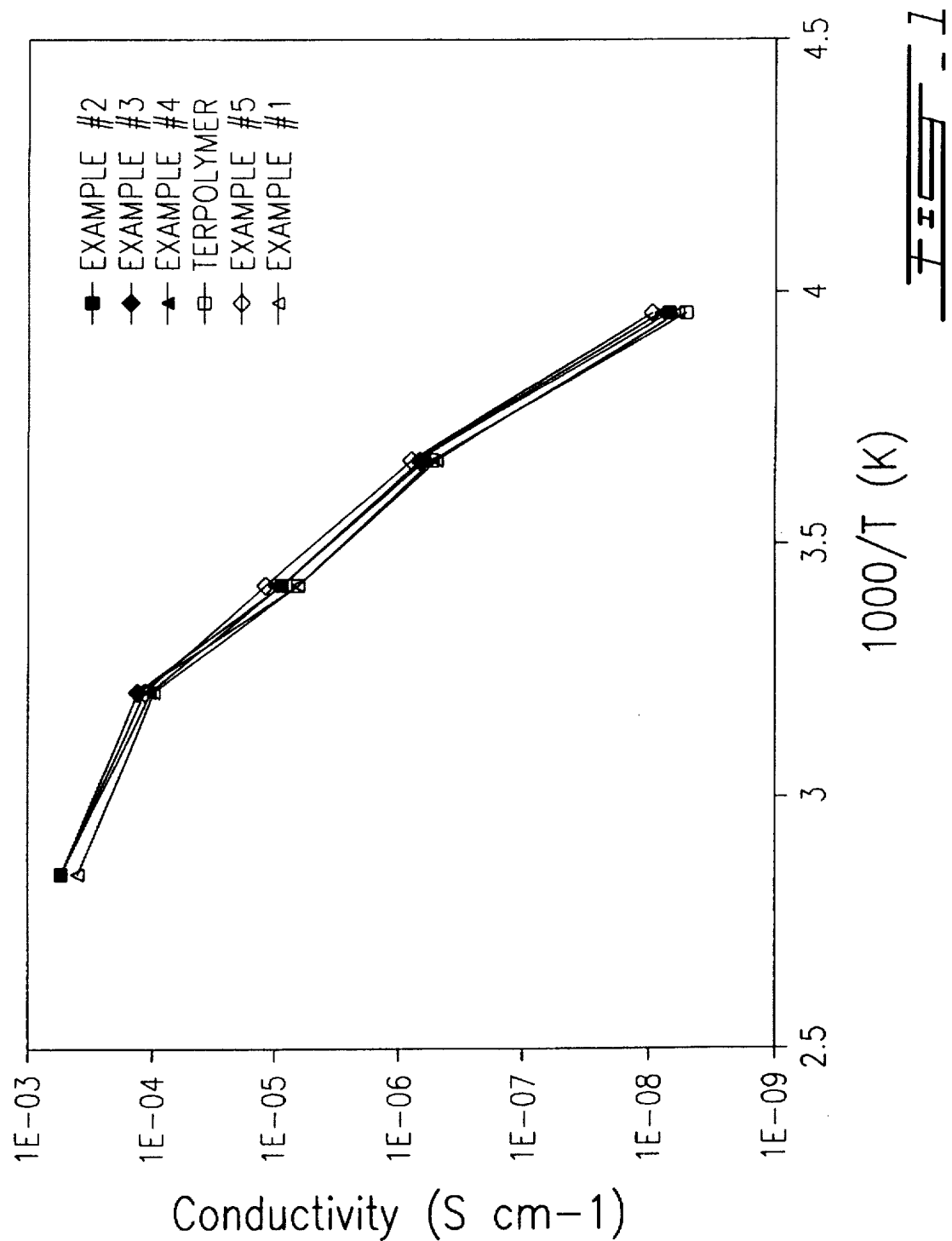
FIG. 1 illustrates curves of the variation of the ionic conductivity as a function of the reverse of the temperature for the electrolytes of examples 1 to 5.

After being coated as a film 30 μm thick, the material is heated under an inert atmosphere at 850° C. for 24 hours. The cross-linked product obtained has a resistance to penetration higher than the terpolymer alone (cross-linked) and a similar ionic conductivity, see Table 1 and FIG. 1.

EXAMPLE 2

All the manipulations are carried out in a glove box under an inert and anhydrous atmosphere. To 20.0 ml of the mother solution the preparation of which has been described in Example 1, 0.90 ml of a solution obtained by dissolving 11.3 g of bis(trifluoromethane-sulfonimide) lithium salt in 52 g of commercial polyoxyethylene glycol dimethacrylate of molecular weight 200 (available from Polysciences) is added. The mixture of these two solutions is thereafter stirred at room temperature for about 12 hours. 2% of benzoyl peroxide by weight of polymer are added and the solution is again stirred for 90 minutes.

After being coated as a film 30 μm thick, the material is heated under an inert atmosphere at 850° C. for 24 hours. The cross-linked product obtained has a resistance to penetration higher than the terpolymer alone (cross-linked) and a similar ionic conductivity, see Table 1 and FIG. 1.

Figure 2:
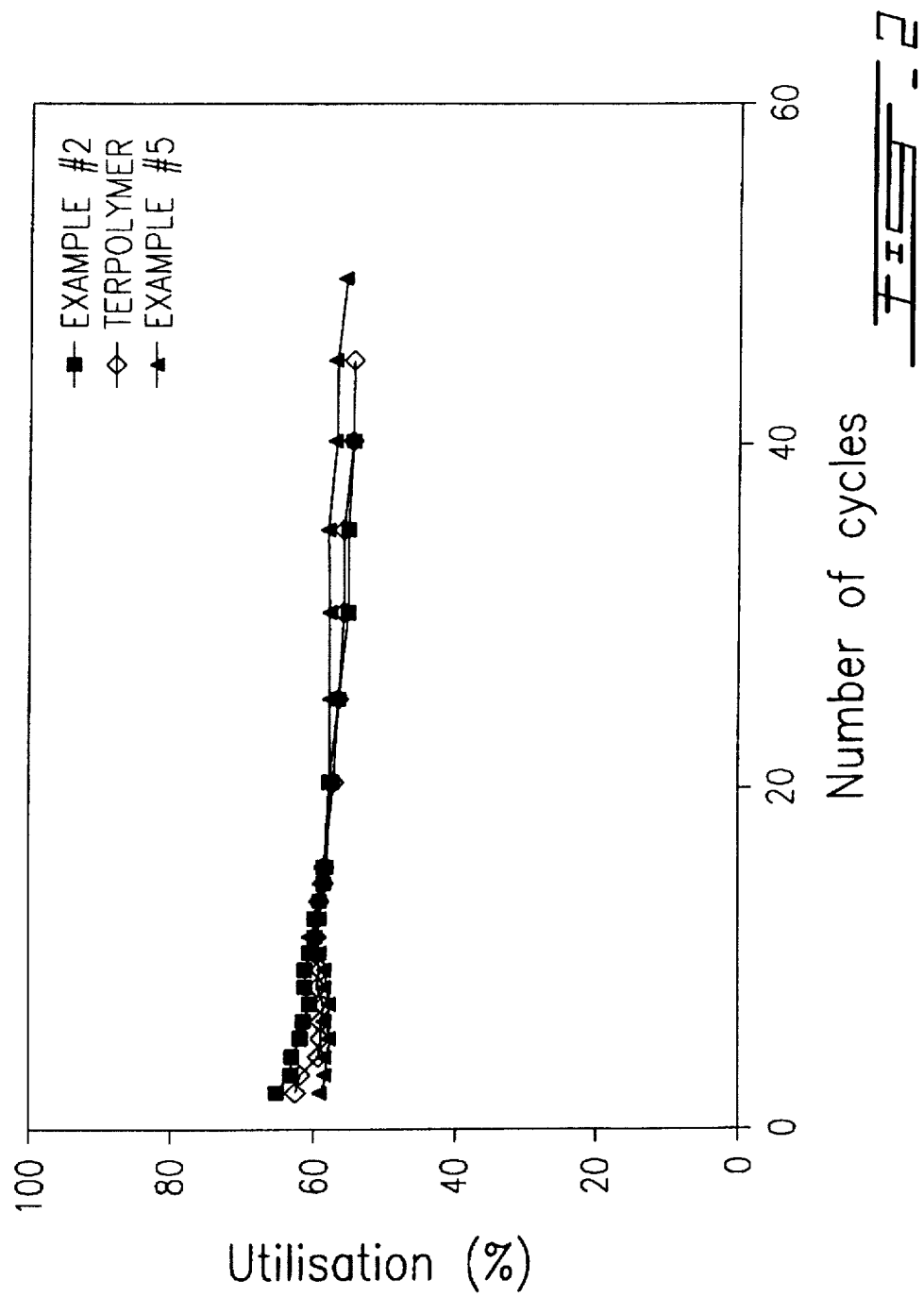
FIG. 2 illustrates curves showing the percentage of utilization of the positive electrode material as a function of the number of cycles of charge/discharge obtained at 60° C. for the electrolytes of examples 2 and 5 and an electrolyte produced from one single terpolymer alone.

An electrochemical generator is made using a negative electrode of metallic lithium 35 μm thick, laminated on a current collector of 8 μm nickel. The electrolyte consists of a polymer membrane as described in the previous paragraph (polymer membrane 30 μm thick containing lithium bis (trifluoro-methanesulfonimide) salt in a molar ratio O/Li= 30). The positive electrode contains a mixture of ranadium oxide powder, Shawinigan carbon black and a terpolymer containing bis(trifluoromethane-sulfonimide) lithium salt in a molar ratio O/Li=30, said positive electrode having a capacity of 6 $Cb/cm^2$. The composite material is solvent coated on an 8 μm aluminum current collector so as to form a film 45 μm thick. The electrochemical generator is assembled by hot pressing at 80° C. under a vacuum. Cycling results at 60° C., as shown in FIG. 2, indicate a cycling behavior which is comparable to the one obtained with the terpolymer alone, 100% corresponding to the 6 $Cb/cm^2$ capacity of the positive, the negative electrode being in excess. The deep discharge cycles were obtained at constant discharge current Id of 300 μamp/$cm^2$ and charge current of 200 μamp/$cm^2$, between voltage limits of 3.3 V and 1.5 V.

EXAMPLE 3

All the manipulations are carried out in a glove box under an inert and anhydrous atmosphere. To 20.0 ml of the mother solution the preparation of which is described in Example 1, is added 0.90 ml of a solution obtained by dissolving 4.5 g of lithium bis(trifluoromethanesulfonimide) salt in 20.8 g of a triblock copolymer of formula AGE$_4$-OE-AGE$_4$ (where AGE=allyl glycidyl ether and OE=ethylene oxide) (see PCT/FR92/00542), in which the terminal OH groups have been treated with acryloyl chloride so as to replace them by an acryloyl group. The mixture of these two solutions is thereafter stirred at room temperature during about 12 hours. 2% of benzoyl peroxide by weight of polymer are added and the solution is again stirred for 90 minutes.

After being coated as a film 30 μm thick, the material is heated under an inert atmosphere at 80° C. for 24 hours. The cross-linked product obtained has a resistance to penetration higher than the terpolymer alone (cross-linked) and a similar ionic conductivity, see Table 1 and FIG. 1.

EXAMPLE 4

All the manipulations are carried out in a glove box under an inert and anhydrous atmosphere. To 20.0 ml of the mother solution the preparation of which is described in Example 1, is added 0.40 ml of a solution obtained by dissolving 4.5 g of lithium bis(trifluoromethanesulfonimide) salt in 20.9 g of glycerol tri[poly((oxyethylene) (oxypropylene) monoacrylate] of molecular weight 8,000. The mixture of these two solutions is thereafter stirred at room temperature for about 12 hours. 2% of benzoyl peroxide by weight of polymer are added and the solution is again stirred for 90 minutes.

After being coated as a film 30 μm thick, the material is heated under an inert atmosphere at 85° C. for 24 hours. The cross-linked product obtained has a resistance to penetration higher than the terpolymer alone (cross-linked) and a similar ionic conductivity, see Table 1 and FIG. 1.

EXAMPLE 5

All the manipulations are carried out in a glove box under an inert and anhydrous atmosphere. To 20.0 ml of the mother solution the preparation of which is described in Example 1, is added 0.90 ml of a solution obtained by dissolving 4.5 g of lithium bis(trifluoromethanesulfonimide) salt in 20.9 g of glycerol tri[poly((oxyethylene) (oxypropylene) monoacrylate] with a molecular weight 8,000. The mixture of these two solutions is thereafter stirred at room temperature for about 12 hours. 2% of benzoyl peroxide by weight of polymer are added and the solution is again stirred for 90 minutes.

After being coated as a film 30 μm thick, the material is heated under an inert atmosphere at 85° C. for 24 hours. The cross-linked product obtained has a resistance to penetration which is higher than the terpolymer alone (cross-linked) and a similar ionic conductivity, see Table 1 and FIG. 1.

An electrochemical generator is prepared as in Example 2. The electrolyte consists of a polymer membrane such as described in the preceding paragraph (polymer membrane 30 μm containing lithium bis(trifluoro-methanesulfonimide) salt in a molar ratio O/Li=30). The cycling at 60,° C. results, FIG. 2, show a cycling behavior which is comparable to that obtained with the terpolymer alone.

EXAMPLE 6

All the manipulations are carried out in a glove box under an inert and anhydrous atmosphere. To 20.0 ml of the mother solution the preparation of which is described in Example 1, is added 0.90 ml of a solution obtained by dissolving 4.5 g of lithium bis(trifluoromethanesulfonimide) salt in 20.0 g of 1,1,-trimethylolpropane triacrylate (available from Polysciences). The mixture of these two solutions is thereafter stirred at room temperature for about 12 hours. 2% of benzoyl peroxide by weight of polymer are added and the solution is again stirred for 90 minutes.

After being coated as a film 30 μm thick, the material is heated under inert atmosphere at 850° C. for 24 hours. The cross-linked product obtained has a resistance to penetration higher than the terpolymer alone (cross-linked), see Table 1.

EXAMPLE 7

To 2 kg of a copolymer OE-MGE-AGE having a molecular weight of 150,000 are added 700 g of glycerol tri[poly (oxyethylene) (oxypropylene) monoacrylate] of molecular weight 8000, 600 g of lithium TFSI salt (3M), 13 g of Santonox® antioxidant (Monsanto) and 7 g of Irgacure 651® photo-initiator (Ciba Geigy). The mixture is introduced into a Warner and Pfilder extruder equipped with a double screw and a flat die 17 cm wide. The temperature of the double screw is 700° C., that of the die is 1500° C., the rotation speed of the screws is 120 rpm and the pressure is about 1,000 psi. The molten film which exits from the die is first coated on a polypropylene (PP) film substrate circulating at 2 meters/min. under the die. A UV lamp of 300 W from Fusions Systems, operating at 254 nm, is placed 50 cm below the film. After being peeled from the PP substrate, a film of electrolyte 30 μm thick is obtained, the mechanical properties of which are excellent, similar in all respects to those of Example 5. The thickness may easily be reduced to 8 μm by increasing the speed of the substrate to 7 m/min., while preserving good mechanical properties. The PP substrate is replaced by an LPB cathode film prepared as in Example 2 but longer and a LPB half cell is obtained on which a thin film of lithium 15 μm thick is laminated, providing a complete LPB battery the electrochemical properties of which are similar to those of Example 5.

EXAMPLE 8

To 2.2 kg of an LPB copolymer with a molecular weight of 150,000 are added 0.35 kg of polyethylene glycol (200) diacrylate (Polysciences), 0.4 kg of high molecular weight polyethylene oxide 5M (Union Carbide), 700 g of lithium TFSI salt (3M), 15 g of Santorox antioxidant (Monsanto) and 15 g of Irgacure 651 photo-initiator (Ciba). The addition of high molecular weight polyethylene oxide (5M) is necessary to compensate for the decrease of viscosity of the molten mixture, resulting from the presence of low molecular weight polyethylene glycol diacrylate, and to maintain a sufficient mechanical strength to the molten film at the outlet of the die of the extruder. The mixture is extruded as in Example 1 and provides a film of electrolyte the mechanical and electrochemical properties of which are similar.

EXAMPLES 9

All the manipulations are carried out in a glove box under an inert an anhydrous atmosphere. 360 g of copolymer based on ethylene oxide and methylglycidyl ether having a molecular weight of 150,000 and 80 g of lithium TFSI are added to 1640 ml of acetonitrile. The salt and copolymer concentration was adjusted so as to give an oxygen over lithium molar ratio (O/Li) of approximately 30/1. To 20.0 ml of this mother solution, 0.43 ml of a solution obtained by dissolving 8 g of bis(trifluoromethanesulfonimide)lithium salt in 35 ml of trimethylolpropane tri[poly(oxyethylene) (oxy-butylene)acrylate] having a molecular weight of 6,000 is added. The mixture of these two solutions is then stirred at room temperature for about 12 hours. 0.05% of Irgacure 651 by weight of polymer are added and the solution is again stirred for 30 min. After being coated as a film 60 μm thick on PP film, the material is heated under an inert atmosphere at 40° C. for 60 min. to evaporate the solvent, and then irradiated UV light (the same as described in Example 7) for 1 min. After peeling from the PP substrate, a film of electrolyte 25 μm thick is obtained, the mechanical properties of which are excellent, see Table 1.

EXAMPLE 10

All the manipulations are carried out in a glove box under an inert and anhydrous atmosphere. 360 g of copolymer based on ethylene oxide and methylglycidyl ether having a molecular weight of 150,000 and 80 g of lithium TFSI are added to 1640 ml of acetonitrile. The salt and copolymer concentration was adjusted so as to give an oxygen over lithium molar ratio (O/Li) of approximately 30/1. To 20.0 ml of this mother solution, 0.5 ml of a solution obtained by dissolving 8 g of bis(trifluoromethanesulfonimide)lithium salt in 35 ml of glycerol tri[poly(oxyethylene) (2-(2-methoxy-ethoxy)ethyl glycidylether) acrylate] of molecular weight 7,000 is added. The mixture of these two solutions is then stirred at room temperature for about 12 hours. 0.05% of Irgacure 651 by weight of polymer are added and the solution is again stirred for 30 min. After being coated as a film 60 μm thick on PP film, the material is heated under an inert atmosphere at 40° C. for 60 min. to evaporate the solvent, and then irradiated UV light (the same as described in Example 7) for 1 min. After peeling from the PP substrate, a film of electrolyte 25 μm thick is obtained, the mechanical properties of which are excellent, see Table 1.

TABLE 1

Mechanical properties of the cross-linked films

| Polymers | Resistance to penetration (MPa) |
| --- | --- |
| terpolymer alone | 1.6 |
| example 1 | 3.5 |
| example 2 | 4.0 |
| example 3 | 3.6 |
| example 4 | 3.5 |
| example 5 | 4.1 |
| example 6 | 8.0 |
| example 9 | 6.2 |
| example 10 | 5.4 |

Tests carried out with a hemispherical tip 7 mm diameter and a load of 240 g at 60° C.
The thickness of the membranes was 60 ± 3 μm.

We claim:

1. A polymer electrolyte composition for LPB electrochemical generators, said generators comprising positive and negative electrodes, and an electrolyte, said electrolyte having a polymer matrix which comprises a mixture of at least one polymer of type (a) and at least one compound of type (b), the polymer of type (a) having a molecular weight higher than about 25,000, and being selected from homopolymers and copolymers commonly used in LPB batteries, said polymer of type (a) also being able to dissolve lithium salts, having at least two cross-linkable functions, and being capable of adhering on said electrodes, the compound of type (b) having a molecular weight lower than about 20,000, being chemically compatible with the polymer of type (a), and having at least two cross-linkable functions.

2. Composition according to claim 1, wherein the polymer of type (a) is a cross-linkable polymer including at least two cross-linkable functions consisting of
   (i) a random polyether copolymer of ethylene oxide and a comonomer selected from the group consisting of a substituted ether oxide of the formula,

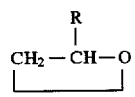

wherein R is Ra, wherein Ra is alkyl, alkenyl, or alkylnyl having 1 to 12 carbon atoms or —CH$_2$—O—Re—Ra wherein Ra is as defined above, Re is a polyether of the formula —(CH$_2$—CH$_2$—O)p, wherein p is an integer from 0 to 10 and a cyclic ether having a ring containing more than 3 carbon atoms selected from the group comprising tetrahydrofurane, dioxolane and functional derivatives thereof, wherein cross-linking is obtained by reaction of the cross-linkable functions with a cross-linking agent, (ii) a macromolecular material of cross-linked polymers or oligomers containing heteroatoms in the monomer unit or in side chains and at least two cross-linkable functions, characterized by the fact that the heteroatoms are selected from nitrogen, oxygen, sulfur and phosphorus, the ratio of the number of carbon atoms to the number of heteroatoms in the polymers or oligomers is between 1 and 12, and the polymers or oligomers are sequenced or grafted random copolymers or sequenced or grafted polycondensates derived from cyclic ethers, formaldehyde, acetaldehyde, aziridines or ethylene diamine, or (iii) an organometallic polymer comprising an organic polymer in which a metal is directly connected by means of an oxygen atom to at least two organic polymer chains, wherein the organic polymer comprises at least one monomer containing at least one hetero atom capable of forming a donor-acceptor bond with cations of the salts and wherein said metal has at least two carbon-metal bonds, with the metal being chosen from the group consisting of aluminum zinc, and magnesium, wherein the organic polymer comprises a monomer moiety of the formula:

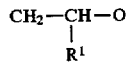

wherein R$^1$ is hydrogen, Rv, —CH$_2$—O—Re—Ra or —CH$_2$—N(CH$_3$)$_2$, wherein Rb is C$_{1-16}$ alkyl or a C$_{1-16}$ cycloalkyl, and Re is a polyether group of the following formula

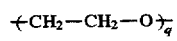

wherein q is an integer with a value of from 1 to 100, wherein the organic polymer further comprises a monomer moiety of the formulas

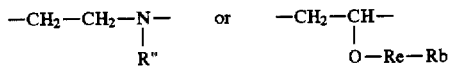

wherein R" is Rb or —Rd—Rb, or

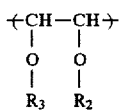

wherein $R_3$ and $R_2$ are independently $R_c$, $R_d$ $R_b$, $R_d$-$R_b$, or $R_c$-$R_a$, and wherein $R_d$ is a group of the following formula

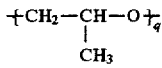

wherein q is as defined above.

3. Composition according to claim 1, wherein the compound of type (b) is an oligomer containing at least two cross-linkable functions.

4. Composition according to claim 1 wherein the compound of type (b) possesses at least one reactive double bond.

5. Composition according to claim 4, wherein the cross-linkable functions of the compound of type (b) are selected from allyl, vinyl, acrylate or methacrylate groups.

6. Composition according to claim 1 wherein the polymer of type (a) and the compound of type (b) are cross-linkable by UV-irradiation.

7. Composition according to claim 1 wherein the polymer of type (a) and the compound of type (b) are cross-linkable by thermal means.

8. Composition according to claim 1, wherein said (a) and (b) are capable of solvating lithium salts used in generators.

9. Composition according to claim 1, wherein at least one lithium salt which is suitable for use in LPB electrochemical generators is present in the polymer matrix.

10. Composition according to claim 9 wherein, wherein the lithium salt is selected from the group consisting of lithium tetrafluorosulfonimide, lithium salts derived from bis perhalogenoacyl and bis sulfonylimide, $LiClO_4$, $LiSCN$, $LiBF_4$, $LiAsF_6$, $LiCF_3SO_3$, and $LiPF_6$.

11. Composition according to claim 1, wherein the electrolyte polymer matrix is essentially free of plasticizer.

12. Composition according to claim 1, wherein the electrolyte polymer matrix comprises close to 0 to 70% by weight of a liquid plasticizer which is suitable for use in LPB electrochemical generators.

13. Composition according to claim 12, wherein the liquid plasticizer is selected from the group consisting of propylene carbonate, ethylene carbonate, tetrahydrofuran, 2-methyl tetra-hydrofuran, 1,3-dioxolan, 4,4-dimethyl-1,3-dioxolan, γ-butyrolactone, butylene carbonate, sulfolane, 3-methylsulfolane, tert-butyl ether, iso-butyl ether, 1,2-dimethoxy ethane, 1,2-ethoxymethoxy ethane, ethylene glycol-diethyl ether, polyethyleneglycols, and sulfonamides of the formula: $R_1R_2N$-$SO_2NR_3R_4$, wherein $R_1$, $R_2$, $R_3$ and $R_4$ each represent an organic substituent.

14. Composition according to claim 13, wherein $R_1$, $R_2$, $R_3$ and $R_4$ each represent an alkyl or oxoalkyl group.

15. Composition according to claim 1, wherein the compound of type (b) is a copolymer of formula:

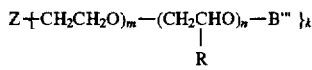

wherein

Z is a residue of a compound having an active hydrogen, k is a whole number which varies between 1 and 6, m is a number equal to 0 or a whole number not less than 1, n is a number equal to 0 or a whole number not less than 1, B'" is an alkyl group, an acyl group or a group having at least one reactive double bond, R is an alkyl group, an alkenyl group or a group of formula:

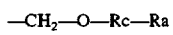

wherein Ra is an alkyl or alkenyl group, and Rc is a segment of formula:

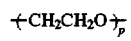

wherein p is a whole number which varies between 0 and 25.

16. Composition according to claim 15, wherein Z is a residue of ethylene glycol and k is a number equal to 2.

17. Composition according to claim 1 wherein the compound of type (b) is a copolymer equivalent to type (a) copolymers, except that the molecular weight is <20,000 and/or the cross-linkable functions are characteristic of type (b) copolymers, thereby leading to multidimensional cross-linking.

18. Composition according to claim 1, wherein the compound of type (b) is a copolymer of type B"AB", wherein A is a homopolymer or a copolymer of ethylene oxide having a molecular weight of about 150 to 20,000 and B" represents an acrylate or methacrylate group.

19. Composition according to claim 18, wherein the copolymer B"AB" is selected from poly-ehtyleneglycol methacrylates and dimethacrylates.

20. Composition according to claim 1, wherein the polymer of type (a) comprises an ethylene oxide-methyglycidyl ether-allyl glycidyl ether terpolymer and the compound of type (b) comprises a polyethylene glycol dimethacrylate.

* * * * *